(No Model.)

G. B. MAYNADIER.
ATTRITION MILL.

No. 292,338. Patented Jan. 22, 1884.

Witnesses.
W. A. Copeland
J. R. Snow

Inventor.
G. B. Maynadier.

UNITED STATES PATENT OFFICE.

GUSTAVUS B. MAYNADIER, OF BOSTON, MASSACHUSETTS, ASSIGNOR OF ONE-HALF TO WILLIAM H. CILLEY, OF SAME PLACE.

ATTRITION-MILL.

SPECIFICATION forming part of Letters Patent No. 292,328, dated January 22, 1884.

Application filed June 14, 1883. (No model.)

*To all whom it may concern:*

Be it known that I, GUSTAVUS B. MAYNADIER, of Boston, in the county of Suffolk and State of Massachusetts, have invented a new and useful Improvement in Attrition-Mills, of which the following is a specification.

My invention relates to improvements in attrition-mills in which the material is ground by the attrition and impact of portions of the material contained in revolving chambered heads against another portion contained in a hopper or case communicating with the chambers of the heads.

The object of my invention is to provide means more effectual than any heretofore devised for keeping the hopper or case free from the dust or flour so largely produced in mills of this class. To attain this object I have made the bottom of the hopper reticulated or sieve-like, and have arranged the hopper or case so that it can be subjected to a shaking or vibrating motion by means of suitable mechanism, substantially as hereinafter described.

Figure 1:
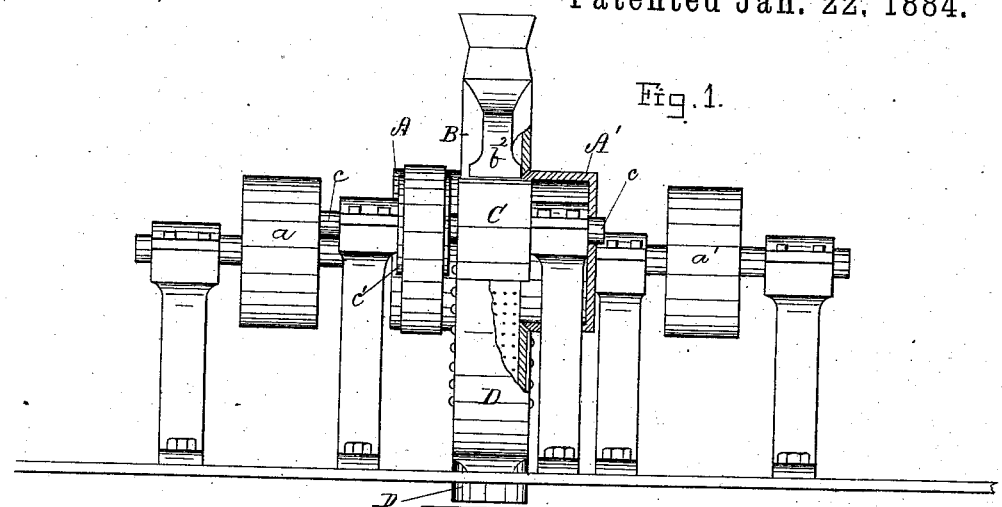
Figure 2:
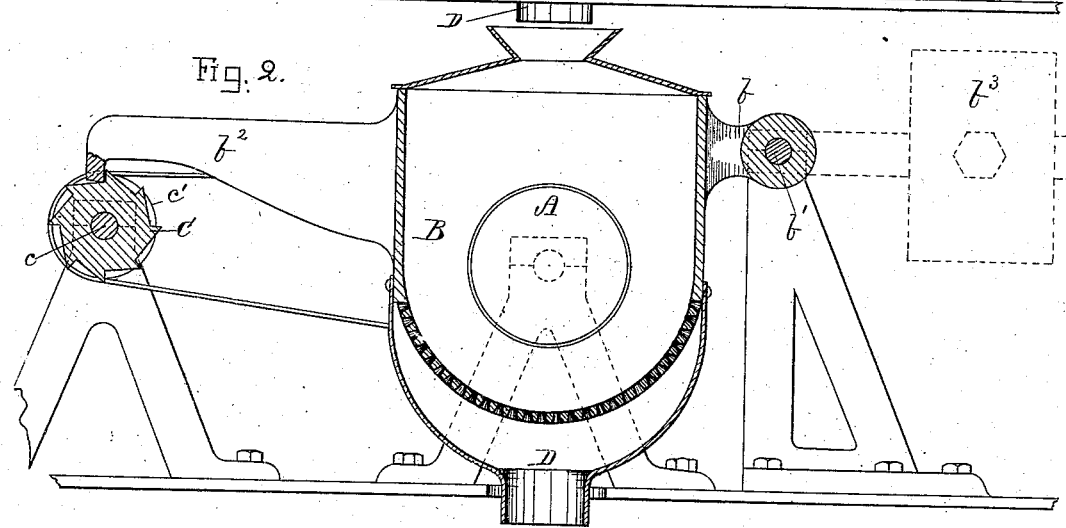
Figure 3:
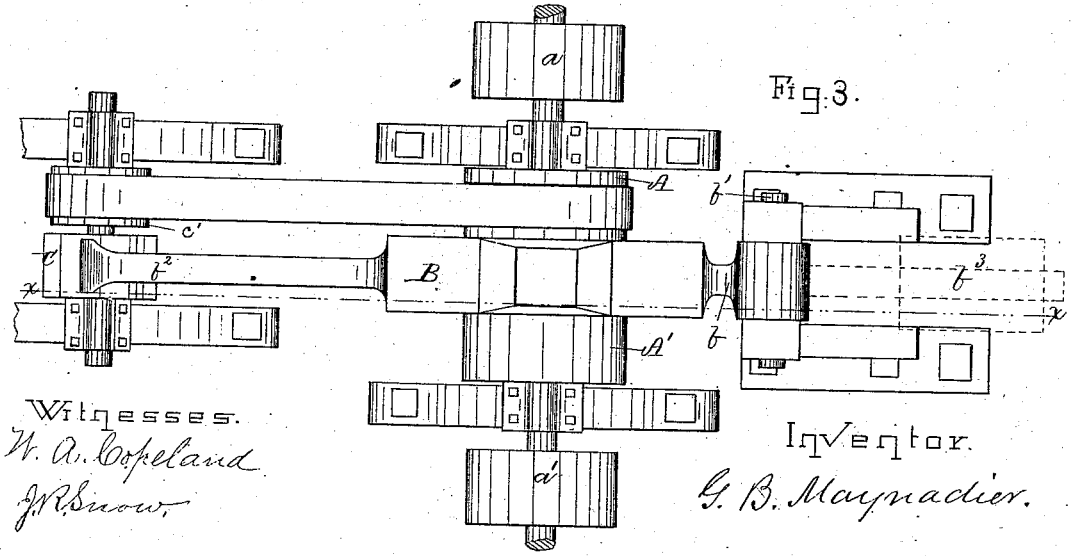

In the accompanying drawings, which illustrate an attrition-mill with its hopper arranged to receive a shaking or vibratory motion and a device for imparting such motion to the hopper, Figure 1 is a front view, partly in section; and Fig. 2 is a cross-section on line $x$ $x$ of Fig. 3, which is a plan or top view.

The chambered heads A A' are suitably mounted upon shafts, which are provided with pulleys $a$ $a'$, to be revolved in opposite directions, said heads having their open ends close against openings in the sides of the hopper B. The hopper B, instead of being fixed, as heretofore in such mills, is supported at one end by an arm, $b$, provided with journals or trunnions $b'$, mounted in suitable boxes. The other end of the hopper B is supported by an arm, $b^2$, the outer extremity of which rests on a toothed cam. C. An adjustable counter-weight, $b^3$, may be attached, as indicated in dotted lines, to regulate the weight thrown on the cam C. The cam C is provided with a shaft, $c$, and a pulley, $c'$, by means of which it can be revolved by a belt from one of the chambered heads or from any other suitable driving mechanism. In Figs. 1 and 3 the belt is shown as driven by the chambered head A. By thus utilizing one of the heads a separate pulley for driving the cam C is dispensed with. The teeth of the cam C are arranged to give the requisite motion to the outer extremity of the arm $b^2$ to cause a shaking or tremor at that part of the hopper B opposite the open ends of the heads A A'. The bottom of the hopper B is made like a screen or sieve, of any well-known construction, having its meshes or openings of any desired size. In the drawings I have shown the bottom made with perforations small on the inside and increasing in size to the outside.

Instead of making the bottom a part of the hopper, it can be made separate, so that finer or coarser sieves can be inserted at pleasure, or a new one be inserted to replace one too much worn. The bottom may be made flat or otherwise; but the preferred form is that shown in the drawings, that is concentric with the chamber-heads. This shape facilitates the movement of the material next to the bottom and prevents the meshes of the screen from becoming clogged. The shaking or tremor caused by the revolving cam C and the jerking motion caused by having the bottom below the center of the trunnions $b'$ keep the coarse material always on top and give a sliding or traveling motion to the finer material and dust next to the reticulated or sieve-like bottom, thereby causing the dust to pass rapidly out and leave the interior of the hopper and the material therein free therefrom. A spout, D, is attached to the bottom of the hopper and conveys the dust to suitable receptacles or assorting devices.

I claim as my invention—

In a mill of the character hereinbefore described, the combination of the rotary chambered heads with a hopper communicating with the chambers of the heads, having its bottom reticulated or sieve-like and arranged to receive a shaking or vibratory motion, and means for imparting such motion, substantially as and for the purpose set forth.

G. B. MAYNADIER.

Witnesses:
W. A. COPELAND,
J. R. SNOW.